United States Patent [19]

Narumiya

[11] 4,257,810
[45] Mar. 24, 1981

[54] CORDIERITE, SILICA, ALUMINA POROUS CERAMIC BODY

[75] Inventor: Tsuneaki Narumiya, Yokohama, Japan

[73] Assignee: Bridgestone Tire Company Limited, Tokyo, Japan

[21] Appl. No.: 66,116

[22] Filed: Aug. 13, 1979

[30] Foreign Application Priority Data

Aug. 12, 1978 [JP] Japan .................................. 53-98448
Feb. 19, 1979 [JP] Japan .................................. 54-18084

[51] Int. Cl.$^3$ ...................... C04B 21/00; C04B 35/04; C04B 35/10; C04B 35/14
[52] U.S. Cl. .................................. 106/41; 106/40 R; 106/62; 75/69; 75/93 R; 210/510
[58] Field of Search .................. 106/40 R, 62, 41; 210/510, 206, 69; 75/69 R, 93 R

[56] References Cited

U.S. PATENT DOCUMENTS

| | | |
|---|---|---|
| 3,893,917 | 7/1975 | Pryor et al. .................. 210/510 |
| 3,897,221 | 7/1975 | Salyer et al. ................ 106/40 R |
| 3,947,363 | 3/1976 | Pryor et al. ................. 106/40 R |
| 3,950,175 | 4/1976 | Lachman et al. .............. 106/62 |
| 4,001,028 | 1/1977 | Frost et al. ................. 106/40 R |
| 4,004,933 | 1/1977 | Ravault ..................... 106/40 R |

*Primary Examiner*—O. R. Vertiz
*Assistant Examiner*—Mark Bell
*Attorney, Agent, or Firm*—Sughrue, Rothwell, Mion, Zinn and Macpeak

[57] ABSTRACT

A ceramic porous body for use in filtering molten metal is disclosed. The ceramic porous body has a three-dimensionally network cellular structure with a plurality of interconnected voids and is characterized by having a pore size of 25-35 pores per linear centimeter in optional cut area, a bulk specific gravity of 0.3-0.7, a porosity of 75-90%, and a pressure loss of 4.8-30.0 mm as a water-gauge pressure when passing air through the body of 1 cm thickness at a rate of 1 m/sec.

4 Claims, 4 Drawing Figures

CORDIERITE, SILICA, ALUMINA POROUS CERAMIC BODY

The present invention relates to ceramic porous bodies useful as a filtering material for molten metal such as molten aluminum and the like, and more particularly to ceramic porous bodies having excellent properties as a filtering material for melts of fresh metals.

Recently, there is largely increased a demand for metal articles such as aluminum cans for drink, aluminum foils for package, copper wires for electrical conductor and the like. These metal articles such as metal thin sheets with a thickness of not more than 400μ, metal fine wires with a diameter of not more than 100μ and the like are usually manufactured by rolling or drawing of the respective metal cast product. In the manufacture of the metal articles, it is strongly required to make the thickness or diameter thinner or finer. However, if the cast product contains a trace amount of solid impurities, there are caused such defects that pinholes or stripe patterns are produced in the articles during the rolling and that the breaking of wire is caused during the drawing. Therefore, it is necessary to use cast products of high quality for the manufacture of such metal thin sheets and wires and as a result, solid impurities causing the above defects should be completely removed from the cast product.

In general, almost all of the solid impurities are oxides and the like incorporated in molten metal to be used in the production of cast product. Now, it is required to remove these solid impurities by the filtering of molten metal. Particularly, the removal of microfine solid impurities are required in order to manufacture the metal thin sheets and wires from the metal cast product.

Since the metal cast product has usually been produced by filtering a melt of fresh metal, there has hitherto been practised a method of filtering solid impurities by passing molten metal through a bed filter made, for example, of alumina balls with a diameter of several millimeters or alumina sintered body. However, the bed filter using the alumina ball is suitable for the removal of solid impurities as coarser as more than 100μ, but is insuitable for the removal of microfine solid impurities of not less than 100μ. On the other hand, the use of the alumina sintered body can remove the solid impurities of even about 1μ, but a long filtering time is taken due to the large pressure loss and as a result, the productivity is very low and the quality of the resulting cast product becomes superfluous.

Further, there has hitherto been proposed the use of ceramic foams having an open-cell structure as a filtering material for molten metal in Japanese Patent laid-open No. 142,162/76. Such ceramic foams are produced by impregnating an open-celled polyurethane foam with an aqueous slurry of a thixotropic ceramic composition, removing excess slurry from the foam with a multiple rolling pass schedule, and then drying and heating the foam. However, in the restoring of the foam after the removal of excess slurry, membranes of the slurry are formed in the voids near the peripheral part of the foam and toward the deformation direction thereof owing to the thixotropic property of the slurry, so that the clogging of the void in the resulting ceramic foam is frequently caused due to the presence of the membranes near the peripheral part of the foam and toward the thickness direction thereof. Further, the slurry contains chromium and phosphorus compounds causing public nuisance. Moreover, the pore size of the resulting ceramic foam is relatively large and hence the pressure loss is small, so that it has been confirmed that the ceramic foam is unsuitable for the removal of microfine solid impurities of several hundred mμ to few ten μ causing the above defects in the manufacture of the metal thin sheets and wires. Therefore, there are not yet developed filtering materials satisfying two contradictory functions, one of which being a function capable of surely catching and removing the microfine solid impurities from molten metal and the other of which being a function capable of efficiently performing the filtration operation.

The present invention is to improve the above mentioned drawbacks of the conventional ceramic foam and to provide ceramic porous bodies simultaneously satisfying the two contradictory functions which can surely catch and remove microfine solid impurities of several hundred mμ to few ten μ from molten metal to be filtered. That is, the present invention is to provide ceramic porous bodies useful as a filtering material for melts of metals such as aluminum, zinc, copper and the like in the manufacture of metal thin sheets with a thickness of not more than 400μ, preferably 20–400μ or metal wires with a diameter of not more than 100μ, preferably 10–100μ.

According to the present invention, there is provided a ceramic porous body useful as a filtering material for molten metal and having a three-dimensionally network cellular structure with a plurality of interconnected voids without clogging in any directions, characterized by having a pore size of 25–35 pores per linear centimeter appeared in an area cut at optional positions, a bulk specific gravity of 0.3–0.7, a porosity of 75–90% and a pressure loss of 4.8–30.0 mm as a water-gauge pressure when passing air through the body of 1 cm thickness at a rate of 1 m/sec.

The present invention will now be described in greater detail with reference to the accompanying drawings, wherein.

Figure 1:
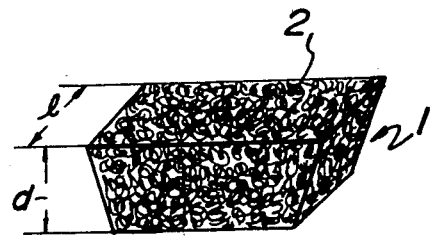
FIG. 1 is a perspective view of an embodiment of the ceramic porous body according to the present invention.
Figure 2:
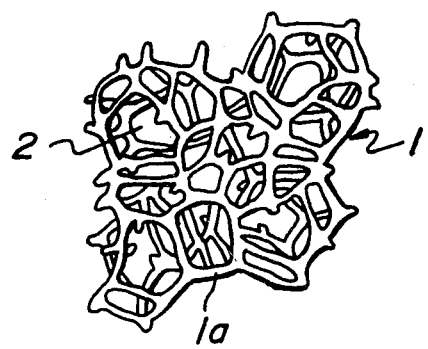
FIG. 2 is a partly enlarged side view of the embodiment shown in FIG. 1.
Figure 3:
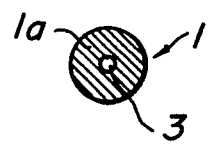
FIG. 3 is an enlarged sectional view of a cell strand in the ceramic porous body according to the present invention.

In FIG. 1 is shown a sketchy outline of a ceramic porous body 1 used as a filtering material for molten metal according to the present invention. The ceramic porous body 1 is obtained by adhering a ceramic slurry to an open-cell, flexible polyurethane foam as a substrate and firing it to carbonize and remove the foam. The thus obtained ceramic porous body 1 has substantially the same three-dimensionally network cellular structure as that of the foam, wherein a plurality of interconnected voids 2 are existent therein without clogging in any directions (as shown in FIG. 2), and is shaped into a frustum of an inverted quadrangular pyramid as a whole. As shown in FIG. 3, a continuous cavity 3 corresponding to the shape of the foam is formed inside cell strands 1a of the ceramic porous body 1. Moreover, the interconnected voids 2 constitute a flow path for molten metal.

According to the present invention, the shape and dimension of the ceramic porous body 1 used as the filtering material for molten metal are not critical, but it is preferably shaped into a frustum of an inverted cone or the like in addition to the above mentioned frustum of inverted quadrangular pyramid. When using the ceramic porous body shaped into the frustum of inverted quadrangular pyramid, it has a thickness d of 20–100 mm, preferably 40–75 mm and a short side length l of 200–1,000 mm, preferably 400–700 mm considering a strength resistant to the load of molten metal and a filtering performance during the filtration.

According to the present invention, the ceramic porous body has a three-dimensionally network cellular structure with a plurality of interconnected voids without clogging substantially in any directions and is characterized by having a pore size of 25–35 pores per linear centimeter in optional cut area, and a pressure loss of 4.8–30.0 mm as a water-gauge pressure when passing air through the body of 1 cm thickness at a rate of 1 m/sec.

In the ceramic porous body according to the present invention, the pore size in optional cut area is measured by adopting the measurement usually applied to flexible polyurethane foams. That is, the pore size is expressed by number of all pores appearing in an optional cut area per linear centimeter when the ceramic porous body is cut at optional positions. Further, the pressure loss is measured according to a second test defined by Japanese Air Cleaning Associate (JACA No. 10).

When the number of pores per linear centimeter is less than 25, the function of catching and holding the microfine solid impurities is poor, while when the number of pores is more than 35, the cell strand of the ceramic porous body becomes finer and the strength of the cell strand is insufficient even if the bulk density of the body is increased as mentioned below. As a result, the cell strands frequently fall off during the mounting to a filter support or are broken by a head of molten metal and consequently the pieces of the cell strand are incorporated into the refined molten metal during the filtration. Further, when the pressure loss is lower than 4.8 mm, the filtering performance against the microfine solid impurities of about $10\mu$ considerably lowers, while when the pressure loss is higher than 30.0 mm, the filtering velocity becomes considerably slower and hence the long filtering time is required.

Furthermore, the ceramic porous body according to the present invention is characterized by having a bulk specific gravity of 0.3–0.7 and a porosity of 75–90%. When the bulk specific gravity is outside the above defined range, the strength and pressure loss of the ceramic porous body as the filtering material for molten metal cannot be retained in the above defined ranges. Further, when the porosity is less than 75%, the pressure loss becomes larger, the long filtering time is required and also the function of holding the microfine solid impurities considerably lowers because the filtration of microfine solid impurities changes from the inside of the ceramic porous body into the surface thereof, while when the porosity exceeds 90%, the strength of the ceramic porous body as the filtering material for molten metal lowers.

In the ceramic porous body according to the present invention, the above factors are relevant to each other for use in filtering molten metal. Especially, by limiting the pressure loss to a range of 4.8–30.0 mm as a water-gauge pressure, there is first obtained the sure and efficient removal of microfine solid impurities existent in a melt of fresh metal or the like. The pressure loss is preferably within a range of 16–30 mm as a water-gauge pressure in order to filter the microfine solid impurities from molten metal more efficiently. However, even when the pressure loss is within the above defined range, if molten metal to be filtered contains a large amount of coarser solid impurities, the filtering performance lowers in a short time. Therefore, if it is intended to filter molten metal containing a large amount of coarser solid impurities such as a melt of reproduced aluminum or the like, it is desirable to effect a preliminary filtration with a filtering material other than the ceramic porous body. Moreover, the ceramic porous body according to the present invention is preferably used for filtering the microfine solid impurities from a melt of fresh metal containing a smaller amount of coarser solid impurities.

Now, when using the ceramic porous body having the pressure loss of higher than 30 mm as a water-gauge pressure, even if it is intended to filter a melt of carefully smelted aluminum, the filtering quantity is only 10 tons per the ceramic porous body of $600 \times 600 \times 50$ mm or there is frequently caused no removal of impurities from the melt during the filtration. On the other hand, when using the ceramic porous body having pressure loss of lower than 4.8 mm as a water-gauge pressure, about few hundred tons of molten metal is passed through the body, but the quality of the resulting cast product is poor and as a result, the pinhole defect is frequently caused in the manufacture of the metal foils and thin sheets or the breaking defect and ununiformity of electical conductivity are caused in the manufacture of the metal wires. Therefore, in order to produce metal cast products of high quality by surely and efficiently catching and removing the microfine solid impurities from molten metal, it is essential to put the pressure loss into the above defined range.

In the manufacture of the ceramic porous body according to the present invention, it is preferable to use a polyurethane foam having a skeletal reticulated structure wherein all of cell membranes are completely removed by heat, with a chemical or the like. By using such skeletal reticulated polyurethane foam as a substrate, there can favorably be obtained ceramic porous bodies 1 having the pressure loss of the defined range and the improved filtering velocity for molten metal. If the polyurethane foam having a slight amount of cell membrane is used as the substrate, the structure of the resulting ceramic porous body 1 degrades the filtering velocity of molten metal, which is contrary to the improvement of the filtering velocity aiming at the present invention. Further, if the removal of excess amount of ceramic slurry applied to the substrate as described below is insufficient or if the excess amount of the ceramic slurry is removed by the deformation of the foam impregnated with the slurry, the clogging of the interconnected void is similarly caused in the resulting ceramic porous body.

According to the present invention, the material of the ceramic porous body 1 is preferably a cordierite phase having a softening temperature of above 1,250° C., which is obtained by firing a ceramic slurry composed essentially of silica, alumina and magnesia at a temperature of 1,300°–1,500° C. That is, the ceramic porous body 1 according to the present invention contains no chromium and phosphorus compounds causing public nuisance and is high in the thermal shock resistance owing to the cordierite phase. Therefore, the ceramic porous body according to the present invention is able to resist to the thermal shock when it is preheated up to a temperature near the temperature of molten metal to be filtered or during the filtration operation and further is sufficiently resistant to chemical attack by molten metal.

The ceramic porous body 1 as shown in FIG. 1 is manufactured by using a flexible polyurethane foam, wherein cell membranes are completely removed by heat or with a chemical, as a substrate, impregnating it with a ceramic slurry essentially composed of silica, alumina and magnesia, which are pulverized to particle size of not more than $40\mu$, removing an excess amount of the slurry covering the cell strands of the foam by air spraying or the like, drying and firing the slurry adhered to the foam at 1,300°–1,500° C. to form cordierite phase. In this way, the ceramic porous body 1 has substantially the same structure as that of the polyurethane foam substrate, so that it is entirely different from the conventional filtering material made, for example, of alumina balls or alumina sintered body in the structure of interconnected voids as a flow path for molten metal. That is, the interconnected voids 2 of the ceramic porous body corresponds to filled portions of the conventional filtering material and each void 2 forms a bucket of pentagonal dodecahedron, each side of which being the cell strand 1a of the void 2. Therefore, the ceramic porous body 1 not only can retain a low pressure loss with a high porosity, but also can increase the rate of holding the solid impurities because the solid impurities are caught inside the bucket.

Figure 4:
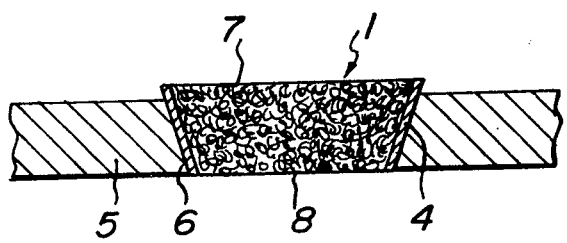
FIG. 4 is a longitudinal sectional view of an embodiment using the ceramic porous body according to the present invention as a filtering material for molten metal.

When the ceramic porous body 1 of the above mentioned structure is used as a filtering material for molten metal, as shown in FIG. 4, all of side surfaces of the body 1 is covered with a ceramic sheet 4, if necessary, and then the body 1 is fitted into a hole 6 having a frustum of an inverted quadrangular pyramid, which being formed in a support 5. In the filtration operation, molten metal is passed from an upper surface 7 of the body 1 into the interconnected voids 2 and then flowed out from a bottom surface 8 of the body 1, during which microfine solid impurities are removed from molten metal through the interconnected voids 2. (Moreover, molten metal may be flowed from a small size surface of the body to a large size surface thereof by giving a head difference of molten metal, which is opposed to the case of FIG. 4.)

As described above, the ceramic porous body 1 according to the present invention is manufactured starting from the skeletal reticulated flexible polyurethane foam as a substrate and is characterized by having the pore size of 25–35 pores per linear centimeter, the bulk specific gravity of 0.3–0.7, the porosity of 75–90% and the pressure loss of 4.8–30.0 mm as a water-gauge pressure when passing air through the body of 1 cm thickness at a rate of 1 m/sec, so that microfine solid impurities of several hundred $m\mu$ to few ten $\mu$ can surely be caught and removed from molten metal. According to the pressent invention, a melt of metals having a melting point of less than 1,200° C. such as aluminum, copper and the like can rapidly and productively be filtered at a linear filtering velocity of 20–200 cm/min. That is, the ceramic porous body 1 according to the present invention simultaneously satisfies a function capable of surely catching and removing microfine solid impurities and a function of efficiently performing the filtration at a proper pressure loss and is preferably used for removing the microfine solid impurities from a melt of fresh metal. Therefore, when molten metal having a melting point of less than 1,200° C. is filtered with the ceramic porous body 1 according to the present invention, the filtered molten metal contains no microfine solid impurities, so that metal thin sheets with a thickness of 20–400$\mu$ or metal wires with a diameter of 10–100$\mu$ can be manufactured from the filtered molten metal without causing surface or interior defects.

According to the present invention, the microfine solid impurities are caught not only on the surface of the ceramic porous body 1 (as filtering material) but also in the interconnected voids 2 thereof, so that the removal of microfine solid impurities can be surely achieved and also the rate of holding the microfine solid impurities caught by the body 1 is high and as a result, a fairly large amount of fresh metal can continuously be filtered. Further, since the strength of the ceramic porous body 1 is high, there is not caused such inconveniences that the ceramic porous body 1, particularly the cell strand 1a thereof is broken by a slight external force when the body 1 is mounted on the support 5 or by the heat of molten metal during the filtration. Consequently, it can favorably be prevented to incorporate the broken pieces of the cell strand into the filtered molten metal.

Furthermore, the pressure loss of the ceramic porous body 1 according to the present invention is larger than that of the conventional filtering material described, for example, in Japanese Patent laid-open No. 142,162/76. Therefore, in order to filter molten metal at the same filtering area and velocity as used in the conventional filtering material, it is necessary to pass a head of molten metal at a higher flow rate through the ceramic porous body. However, the breaking of the ceramic porous body is not caused even under such filtering conditions as apparent from the above. As a result, the use of the ceramic porous body can perform the filtration operation while maintaining the same filtering area and velocity as used in the conventional filtering material and further can surely be removed the microfine solid impurities, which are hardly caught by the conventional filtering material.

Moreover, the ceramic porous body according to the present invention is very high in the thermal resistance, thermal shock resistance and resistance to chemical attack by molten metal owing to the cordierite phase composed essentially of silica, alumina and magnesia, so that it can surely resist to thermal shock when the body is preheated up to a temperature of molten metal to be filtered or during the filtration without attacking by molten metal. As a result, the ceramic porous body is preferably used as a filtering material for molten metal.

The present invention will now be described with reference to the following examples.

COMPARATIVE EXAMPLE 1

Ceramic foams were produced in the same manner as described in Japanese Patent laid-open No. 142,162/76 by providing as a substrate a plurality of skeletal reticulated flexible polyurethane foams having a frustum of an inverted quadrangular pyramid wherein an upper surface is a square of 593×593 mm, a lower surface is a square of 561×561 mm and a height is 50 mm, except that the number of pores in the foam was changed as shown in the following Table 1. In this case, the flexible polyurethane foam was impregnated with a thixotropic ceramic slurry having a composition of 47% Al₂O₃, 13% Cr₂O₃, 3.5% kaolin, 1% bentonite and 14.5% colloidal aluminum orthophosphate added as an aqueous solution with an equal amount of water, and after the excess slurry was removed by means of rollers, the foam covered with the slurry was fired to obtain a ceramic foam having the properties shown in Table 1.

TABLE 1

| Specimen No. | 1 | 2 | 3 | 4 | 5 |
|---|---|---|---|---|---|
| Number of pores per linear centimeter in the foam as the substrate | 3.2 | 10 | 15 | 25 | 30 |
| Pressure loss at a rate of 1 m (mm as water-gauge pressure) | 0.3 | 2.6 | 4.0 | unmeasured | unmeasured |
| Porosity (%) | 88 | 87 | 85 | 77 | 75 |

As apparent from Table 1, the clogging of voids becomes conspicuous when the number of pores in the polyurethane foam is more than 25 per linear centimeter belonging to the defined range of the present invention.

EXAMPLE 1

As a substrate were used two skeletal reticulated flexible polyurethane foams, one of which having 25 pores per linear centimeter and the other of which having 30 pores per linear centimeter. Each foam was a frustum of an inverted quadrangular pyramid wherein an upper surface is a square of 611×611 mm, a lower surface is a square of 577×577 mm and a height is 53 mm.

In an agitating tank was charged a powdery mixture of 50 parts of cordierite made by Marusu Yuyaku Co., Ltd. as a trade name K-8 and 50 parts of alumina made by Sumitomo Aluminum Co., Ltd. as a trade name AM-31 together with a liquid mixture of silica sol and water having a mixing ratio of 2:1, and after the resulting ceramic slurry was agitated over a day, the viscosity was adjusted to 1.5 poises.

The flexible polyurethane foam was impregnated with the ceramic slurry. After the foam was taken out from the slurry, the excess amount of the slurry was removed without deforming the foam. Next, the foam adhered with the slurry was dried at 70° C. for 24 hours and then impregnated with the ceramic slurry having a viscosity of about 0.2 poise. After the removal of excess slurry, the foam adhered with the slurry was dried at 70° C. for 24 hours. The above procedure was repeated so as to obtain a given bulk density of a ceramic foam after fired.

Then, the flexible polyurethane foam covered with the ceramic slurry was fired at about 1,350° C. to obtain a ceramic porous body (or ceramic foam) having properties as shown in the following Table 2 without clogging in any directions.

TABLE 2

| Specimen No. | 6 | 7 |
|---|---|---|
| Number of pores per linear centimeter in the foam as the substrate | 30 | 35 |
| Pressure loss at a rate of 1 m (mm as water-gauge pressure) | 25 | 30 |
| Porosity (%) | 82 | 86 |

EXAMPLE 2

In this example, molten metal was filtered by using the specimens 1-7 as a filtering material.

At first, a chamber with a depth of 500 mm was provided in a flow path for molten metal. In the chamber was arranged a flat partition plate having a thickness of 60 mm at a position of 350 mm downward from the upper end of the chamber. At the center of the partition plate was formed a tapered hole having a square of 593×593 mm at its upper surface and an inclination angle of 17.5° with respect to a direction perpendicular to the upper surface. In the hole was fitted each of the specimens through a packing composed of kaoline wool for preventing the floating of the ceramic foam during the filtration of molten metal. Further, the chamber was sufficiently preheated up to a given temperature near the filtering temperature prior to the passing of molten metal. Then, molten metal was supplied into the chamber so as not to directly fall onto the ceramic foam, whereby molten metal passed through the interconnected voids of the ceramic foam from the upside to the downside and flowed out over an output port.

A 22 t charge of aluminum Alloy 1145 was melted in an open hearth furnace, fluxed with a mixed gas of chlorine and nitrogen in the conventional manner, and then passed through the chamber in the flow path at a rate of 400 kg/min to cast three rolling ingots weighing about 5 t each. Such a procedure was repeated by using the ceramic foam specimens 1-7 as the filtering material or no ceramic foam in the chamber.

The resulting ingots were rolled into aluminum foils of 7μ thickness. The number of pinholes with a diameter of not less than 0.5 mm was measured with respect to each aluminum foil to obtain a result as shown in the following Table 3.

TABLE 3

| | No foam | Specimen 1 | Specimen 2 | Specimen 3 | Specimen 4 | Specimen 5 | Specimen 6 | Specimen 7 |
|---|---|---|---|---|---|---|---|---|
| Initial head (m/m) | 0 | 60 | 100 | 180 | 300 | 300 | 300 | 300 |
| Initial running head (m/m) | 0 | <5 | <5 | <5 | no flow | no flow | 15 | 110 |
| Final running head (m/m) | 0 | <5 | <5 | <5 | no flow | no flow | 50 | 280 |
| Number of pinholes per 1,000 m² | 6.81 | 6.54 | 2.12 | 2.20 | — | — | 0.50 | 0.35 |

EXAMPLE 3

Billets with a diameter of 152φ were produced by filtering aluminum Alloy 6063 in the same manner as described in Example 2. These billets were cut into slices, each of which was measured with respect to the number of white spots according to the anodic oxidation process. Further, the stringer test in a die of 29φ was carried out with respect to each billet to measure the number of stringers per 200 mm visually. The measured results are shown in the following Table 4.

TABLE 4

|  | No foam | Specimen 1 | Specimen 2 | Specimen 3 | Specimen 6 | Specimen 7 |
|---|---|---|---|---|---|---|
| Number of white spots | 42.3 | 43.7 | 31.0 | 19.8 | 5.5 | 8.1 |
| Number of stringers | 20.9 | 17.2 | 14.4 | 6.1 | 0.6 | 0.2 |

As apparent from the above, the ceramic porous body according to the present invention can surely and efficiently remove microfine solid impurities of several hundred mμ to few ten μ in the filtration of molten metal at a linear filtering velocity of 20-200 cm/min and has a high rate of holding the impurities and a satisfactory mechanical strength, metal cast products of high quality can be produced by the use of such a ceramic porous body. Preferably, the ceramic porous body according to the present invention is usable as a filtering material for molten metal in the manufacture of metal thin sheets with a thickness of not more than 400μ, preferably 20-400μ or metal wires with a diameter of not more than 100μ, preferably 10-100μ.

In the examples, the ceramic porous body is shaped into the frustum of the inverted quadrangular pyramid as a whole, but the present invention may be embodied in other forms or carried out in other ways without departing from the scope thereof.

What is claimed is:

1. A ceramic porous body useful as a filtering material for molten metal and having a three-dimensional network cellular structure with a plurality of interconnected voids without clogging in any direction, which consists essentially of a cordierite phase, silica and alumina, characterized by having a pore size of 25-35 pores per linear centimeter in an area cut at optional positions, a bulk specific gravity of 0.3-0.7, a porosity of 75-90%, and a pressure loss of 4.8-30.0 mm as a water-gauge pressure when passing air through said body at 1 cm thickness at a rate of 1 m/sec.

2. A ceramic porous body as claimed in claim 1, wherein said body has a pressure loss of 16-30 mm as a water-gauge pressure.

3. A ceramic porous body as claimed in claim 1, wherein said body is produced by providing an open-cell, flexible polyurethane foam as a substrate, impregnating said foam with a ceramic slurry, removing excess slurry consisting essentially of cordierite phase, silica and alumina without deforming said foam, and firing said foam covered with said ceramic slurry at a temperature of 1,300°-1,500° C. to remove said foam by carbonization.

4. A ceramic porous body as claimed in claim 1, wherein said cordierite phase has a softening temperature of greater than 1,250° C.

* * * * *